(12) United States Patent
Morales

(10) Patent No.: US 12,242,763 B1
(45) Date of Patent: Mar. 4, 2025

(54) PREEMPTIVE PAPER TRAY MANAGEMENT FOR PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/231,559

(22) Filed: Aug. 8, 2023

(51) Int. Cl.
*G06F 3/12* (2006.01)

(52) U.S. Cl.
CPC ............ *G06F 3/1204* (2013.01); *G06F 3/121* (2013.01); *G06F 3/1254* (2013.01); *G06F 3/126* (2013.01); *G06F 3/1282* (2013.01)

(58) Field of Classification Search
USPC ........................................................ 358/1.15
See application file for complete search history.

(56) References Cited

U.S. PATENT DOCUMENTS

| 10,402,128 | B2 | 9/2019 | Yamakawa | |
|---|---|---|---|---|
| 2007/0229865 | A1* | 10/2007 | Yamazaki | H04N 1/00209 358/1.9 |
| 2009/0261524 | A1* | 10/2009 | Nakayama | B65H 3/44 726/19 |
| 2012/0286465 | A1* | 11/2012 | Ooba | B65H 7/04 271/9.01 |
| 2019/0367313 | A1* | 12/2019 | Kaiga | B65H 31/02 |
| 2022/0027691 | A1* | 1/2022 | Iida | G06F 3/1254 |

* cited by examiner

*Primary Examiner* — Jacky X Zheng
(74) *Attorney, Agent, or Firm* — Millen, White, Zelano & Branigan P.C.; William F. Nixon

(57) ABSTRACT

A printing system includes a printing device having paper trays. Each paper tray includes loaded paper and has one or more paper tray settings. The paper trays may be divided into paper tray groups. A number of job sheets needed to complete a current or subsequent print job is compared to the number of loaded sheets of paper in a paper tray group. If not enough loaded sheets are available, then the operator is prompted to load additional sheets. Further, another paper tray can be added to the paper tray group. A paper queue also may specify a quantity of paper to be loaded onto the printing device.

11 Claims, 9 Drawing Sheets

PREEMPTIVE PAPER TRAY MANAGEMENT FOR PRINTING OPERATIONS

FIELD OF THE INVENTION

The present invention relates to a printing device having preemptive paper tray management for improved workflow during printing operations. More particularly, the present invention preemptively prompts an operator to prepare trays for future production needs.

DESCRIPTION OF THE RELATED ART

For production printing systems, productivity is of paramount importance as it directly impacts profitability. This aspect becomes increasingly important as print run lengths continue to decrease and the number of unique jobs that must be printed every day increases. Press operators should work in an efficient manner in order to ensure continuous production even as the paper requirements continually change from print job to print job. Current implementations rely on the operator to ensure that the printing device can produce not just the current job but additional jobs in the queue. Operators that are less diligent may wait until a job is attempting to print before loading the required paper. This delay can lead to reduced efficiency and less profitability.

SUMMARY OF THE INVENTION

A method for performing printing operations is disclosed. The method includes performing printing operations for a print job at a printing device. The method also includes determining a number of job sheets needed to complete the print job. The method also includes determining a number of loaded sheets within a printing tray group at the printing device. The method also includes determining the number of job sheets exceeds the number of loaded sheets. The method also includes prompting an operator to load additional sheets into a first printing tray of the printing tray group. The method also includes detecting the first printing tray is opened to load the additional sheets.

A method for performing printing operations is disclosed. The method includes performing printing operations for a current print job at a printing device. The method also includes querying a job queue of the printing device for a first subsequent print job. The method also includes determining a number of job sheets for the first subsequent print job. The number of job sheets have a first print media. The method also includes determining the number of job sheets for the first subsequent print job exceeds a number of loaded sheets of the first print media within a first printing tray group at the printing device. The method also includes detecting an available printing tray with the first printing tray group is available. The method also includes prompting an operator to load additional sheets of the first print media into the available printing tray of the first printing tray group. The method also includes detecting the available printing tray is opened to load the additional sheets.

A method for performing printing operations is disclosed. The method includes querying a paper queue for a printing device. The paper queue includes an entry for a print media corresponding to at least one print job within a job queue. The method also includes reviewing the entry to determine a number of sheets of the print media for the at least one print job. The method also includes determining that additional sheets of the print media are to be loaded into a printing tray group at the printing device. The additional sheets are not allocated to a current print job at the printing device. The method also includes determining an available printing tray from the printing tray group. The method also includes detecting that the additional sheets are loaded into the available printing tray. The method also includes removing the entry from the paper queue.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
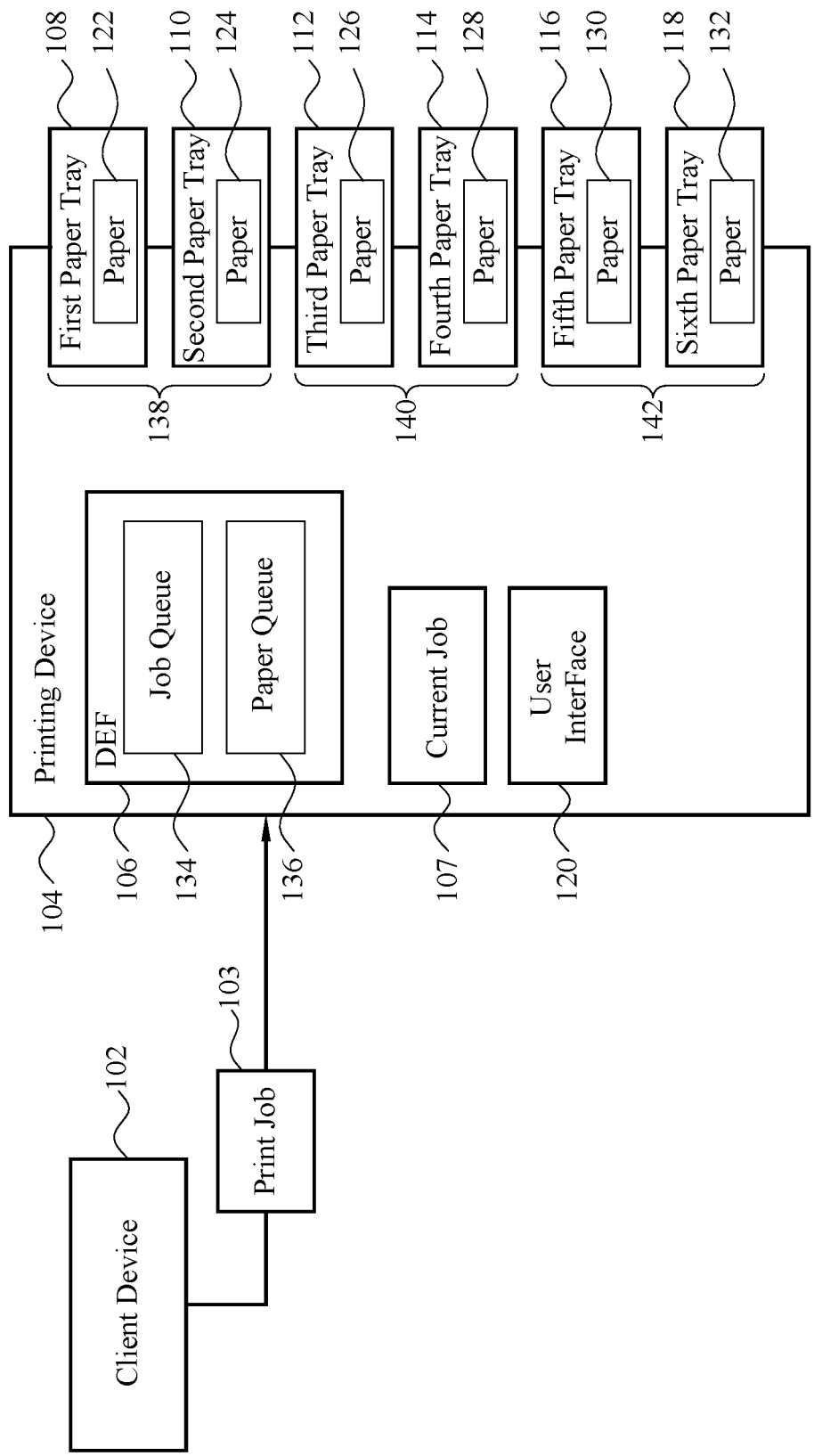
FIG. 1A illustrates a printing system having a printing device for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments enhance printing device tray management behavior. The disclosed embodiments preemptively prompt the operator to prepare trays for future, not just current, production needs. The disclosed embodiments further streamline the process of reconfiguring trays to minimize operator interaction with the printing device. In some embodiments, the operator can configure paper trays as desired at any time. The disclosed embodiments will prompt the operator to load the required paper when it is unavailable for the currently print job.

The disclosed embodiments, however, also evaluates the required media for the currently active and pending jobs in the job queue. The disclosed embodiments then compare this number against the number of sheets of the relevant paper that is loaded in one or more paper trays. If the number of sheets is insufficient, then the disclosed embodiments determine the course of action depending on the available paper. If there is a single tray that holds paper for the current job, then the disclosed embodiments may prompt the operator to load additional paper in another tray. If the printing device is configured to use tray groups to restrict tray switching to a subset of the trays on the printing device, then the disclosed embodiments will only prompt the operator to load paper in one of the trays with the tray group.

If there are two trays that contain paper and if these are not sufficient to print the job, then the disclosed embodiments will prompt the operator to load paper in a third and perhaps fourth tray of the paper tray group. The printing device may limit the number of trays dedicated to a print job based on one of the following criteria such as a tray group or a system-defined limit on the number of trays that may be assigned to a print job. For tray groups, a printing device, for example, may have six (6) trays configured into three (3) groups of two (2) trays each. In some embodiments, two trays are sufficient to enable non-stop production printing.

If the number of sheets is sufficient to complete the current print job, or if the maximum number of trays that can be dedicated to the current job is reached, then the disclosed embodiments will evaluate the next print job in the queue. If there are available trays, then the disclosed embodiments may prompt the operator to load paper in those trays so the printing device is ready to print the next job once the current job completes printing. If there are no available trays and the current job is using multiple trays then the disclosed embodiments will wait until the currently loaded media is sufficient to complete the current print job and there is at least one tray available. The disclosed embodiments will then prompt the operator to configure that tray so that it can be used for the next print job.

As long as there are available trays, the disclosed embodiments will continue to look ahead in the job queue and continue to prompt the operator to load the required paper. In cases where different trays have different capabilities, such as a different range of supported sizes and weights, the disclosed embodiments will subset the trays under consideration to only those that are able to reproduce the print job. Additionally, the disclosed embodiments may consider not just the trays that can reproduce the current job but also the trays are required for additional jobs. In this instance, the disclosed embodiments may give preference to keeping the trays with the broadest media support open for a long as possible to ensure tray reconfiguration can be done as far ahead as possible.

In addition to the above, the disclosed embodiments also will optimize the process of reconfiguring the trays themselves. This feature could be done in multiple places. In the digital front end (DFE) of the printing device, the disclosed embodiments may have a paper queue. The paper queue is a list of papers that must be loaded, the order in which they must be loaded, and the quantity that is required for each paper. It should be noted that the paper queue does not refer to the currently loaded papers even if they are needed for the current or queued print job. Instead, these are the papers that the operator must load into the printing device. Once the operator loads the paper, the disclosed embodiments remove it from the paper queue. If, after loading the paper, the printing device still does not have enough paper to complete the print job, then the disclosed embodiments may, instead, decrement the required quantity so that operator knows how much more paper needs to be loaded in order to complete the print job.

In the printing device user interface, the disclosed embodiments may allow the operator to display the paper that must be loaded next, as shown by information for the top item in the paper queue. This feature allows the operator to see which paper to load next without needing to consult the DFE. Additionally, when the operator opens a tray, the disclosed embodiments may perform one of the following actions. If the paper already in the tray is required for the current job or a queued job, the disclosed embodiments may display a warning to that effect letting the operator know that the operator should not unload this paper from the printing device. If the paper already in the tray is not required for the current or for a queued job, the disclosed embodiments may reconfigure the tray to match requirements thus eliminating the need for the user to reconfigure the tray. This configuration is done based on the job's print ticketing attributes.

These features should reduce reliance on the press operator preemptively ensuring that the printing system is configured for continuous production. Instead, the printing system will prompt the operator to load the required media long before it is actually needed. This feature will help ensure maximum productivity.

FIG. 1A depicts a printing system 100 for printing documents according to the disclosed embodiments. Printing system 100 includes printing device 104. Printing device 104 is disclosed in greater detail below. Printing device 104 may receive one or more print jobs 103 within printing system 100. For example, client device 102 may generate and send print job 103 to printing device 104. In some embodiments, printing device 104 may be a production printing device in that print jobs are provided through client device 102, which is attached to the printing device. Such a print job may require 1000s of pages or even 100,000 pages or more.

Printing device 104 may receive print job 103 as it is processing and printing current job 107. Current job 107 may use different paper or media than print job 103. As such, printing device 104 may include a plurality of paper trays to supply papers of various types, sizes, weights, and the like. Thus, printing device 104 includes first paper tray 108 having paper 122, second paper tray 110 having paper 124, third paper tray 112 having paper 126, fourth paper tray 114 having paper 128, fifth paper tray 116 having paper 130, and sixth paper tray 118 having paper 132. Additional paper trays with papers may be installed on printing device 104, but not shown here. Current job 107 may use paper from one or more of these paper trays. In some embodiments, paper 122, paper 124, paper 126, paper 128, paper 130, and paper 132 are different types of paper or different media.

For example, current job 107 may use paper 124 from second paper tray 110 while print job 103 may require paper 122 from first paper tray 108. As printing device 104 prints jobs, it also runs out of paper such that the trays need to be refilled. An operator opens the paper tray to refill the paper or add a different paper based on need. User interface 120 may provide a prompt for one or more settings for the paper tray. The operator may use user interface 120 to update the paper tray settings. For example, current job 107 may require paper 124, which is a specific size, such as A4. The current paper in second paper tray 110 is not A4 so the operator would open the second paper tray to place paper 124 therein. Settings for second paper tray 110 would be updated to indicate that it currently includes A4 paper using user interface 120.

User interface 120 may be in operation panel 208, disclosed below, or part of digital front end (DFE) 106. DFE 106 is disclosed in greater detail below. DFE 106 may process print jobs and act as a controller for printing device 104. Alternatively, user interface 104 may be displayed on client device 102.

Figure 1B:
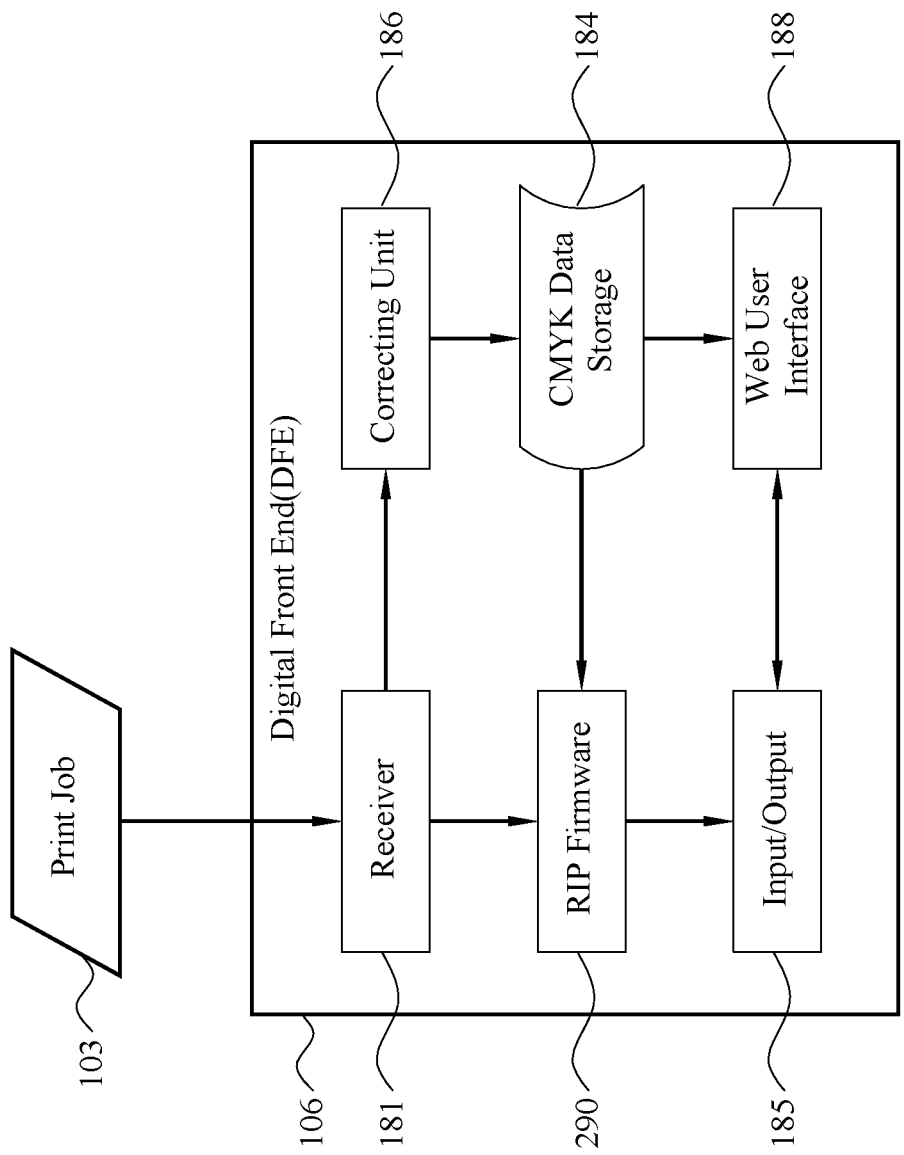
FIG. 1B illustrates a digital front end (DFE) for a printing device according to the disclosed embodiments.

In addition to the features disclosed in FIG. 1B, DFE 106 includes job queue 134 and paper queue 136. Job queue 134 may be a queue of print jobs received by printing device 104 and DFE 106 to process and print. DFE 106 may use a variety of processes to arrange the print jobs within job queue 134, such as first in, priority designation, largest to smallest data size, color printing, and so on. Print job 103 may be received and placed in job queue 134. Current job 107 refers to a print job being processed within DFE 106 or printed using print engine 260. Current job 107 may not be within job queue 134. The disclosed embodiments may look ahead to print jobs in job queue 134 to determine paper requirements for pending print jobs.

DFE 106 also includes paper queue 136. Paper queue 136 may differ from job queue 134 in that it is a list of papers that must be loaded. It also may include the order in which the papers are loaded and the quantity that is required for each paper. Paper queue 136 does not list the currently loaded papers, even if they are needed for current job 107 or print jobs in job queue 134. Instead, paper queue 136 includes papers that the operator needs to load into one or paper trays on printing device 104. Once the operator loads the paper specified in paper queue 136, the paper entry is removed. User interface 120 may display the papers specified in paper queue 136 along with the quantity of the paper to be loaded onto printing device 104.

In some embodiments, paper trays 108-118 may be grouped together. Printing device 104 may incorporate a plurality of paper tray groups to better manage printing operations. For example, paper tray group 138 may include first paper tray 108 and second paper tray 110. Paper tray group 140 may include third paper tray 112 and fourth paper tray 114. Paper tray group 142 may include fifth paper tray 116 and sixth paper tray 118. Paper tray groups may be any number of paper trays and groups may interchange paper trays between groups as needed.

Paper tray groups may be used to restrict tray switching to a subset of the paper trays at printing device 104. If the operator is prompted to load additional paper for a print job, then the disclosed embodiments will prompt to load only one of the paper trays in the appropriate paper tray group. For example, if current job 107 is using papers from paper tray group 140, then papers loaded onto printing device 104 will go to third paper tray 112 or fourth paper tray 114. If a third or fourth paper tray is needed to supply the required number of sheets, then the disclosed embodiments may pull second paper tray 110 from paper tray group 138 and fifth paper tray 116 from paper tray group 142 into paper tray group 140. Thus, paper tray group 140 would include second paper tray 110, third paper tray 112, fourth paper tray 114, and fifth paper tray 116.

Paper tray groups may be formed according to the locations of the paper trays installed on printing device. They also may be formed based on attributes of the paper trays, such as paper size. For example, first paper tray 108 and second paper tray 110 may be the only paper trays on printing device 104 able to handle A3 size sheets. As paper trays are removed from installation on printing device 104, the paper tray groups may be reconfigured accordingly. User interface 120 may display the different paper tray groups and their associated paper trays.

FIG. 1B depicts a block diagram of DFE 106 according to the disclosed embodiments. DFE 106 includes a receiver 181, a RIP firmware 190, a CMYK data storage 184, an input/output connector 185, and a correcting unit 186. Additional components within DFE 106 may be implemented, as shown in FIG. 1A.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE 106.

Figure 2:
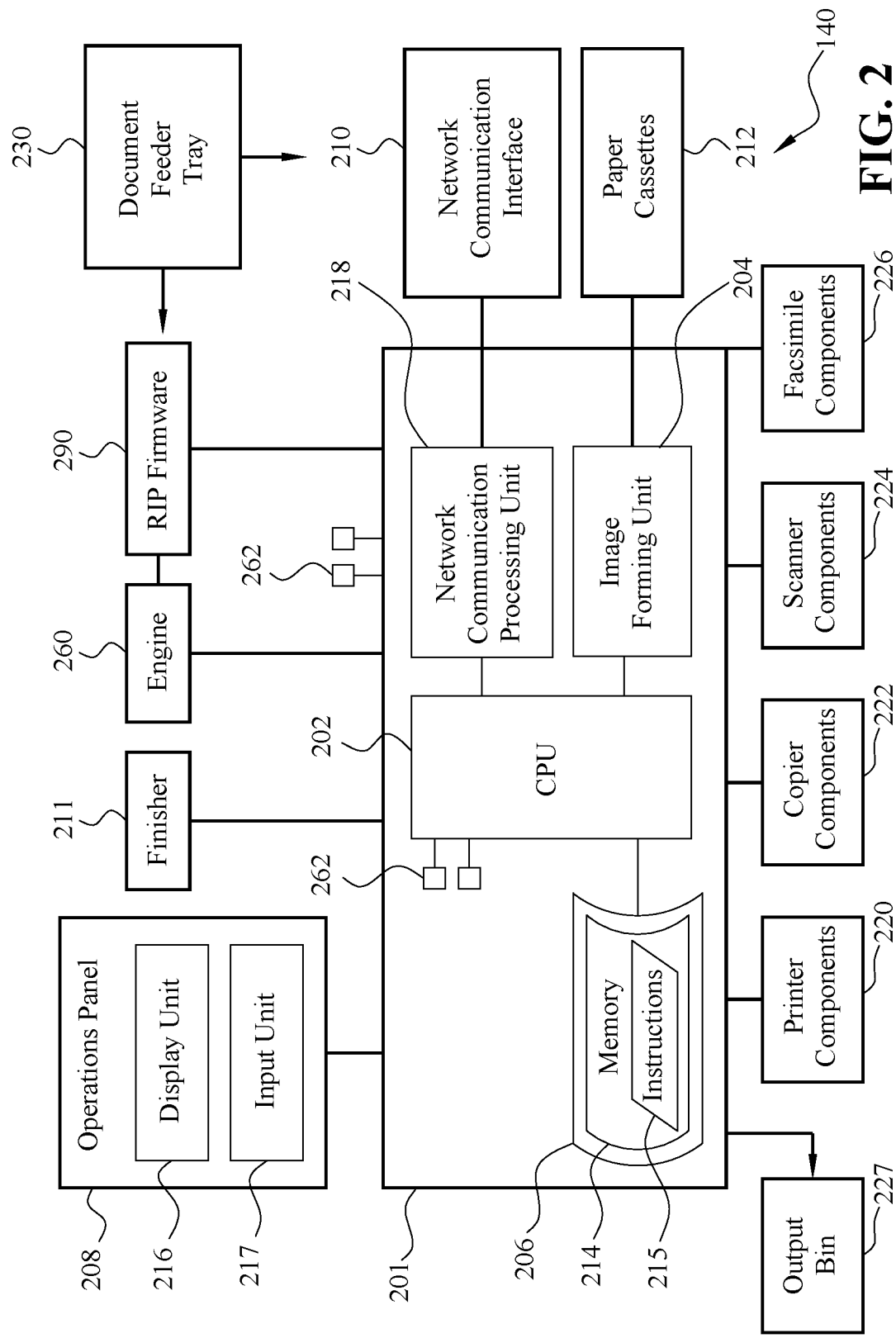
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from DFE 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays, shown as paper trays 108-118 in FIG. 1A. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from DFE 106, if applicable. DFE 106 may send calibration and paper catalog information to printing device 104 for display. For example, the operator at DFE 106 may send a calibration to printing device 104. Printing device 104 displays paper type and any other information needed to complete the calibration.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device. Memory unit 206 may store the history of failure events and occurred errors with a timestamp of each error.

Printing device 104 communicates with other devices within system 100 via network communication interface 210 by utilizing a network protocol, such as the ones listed above.

In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from DFE 106 as well as other devices within system 100.

Figure 3:
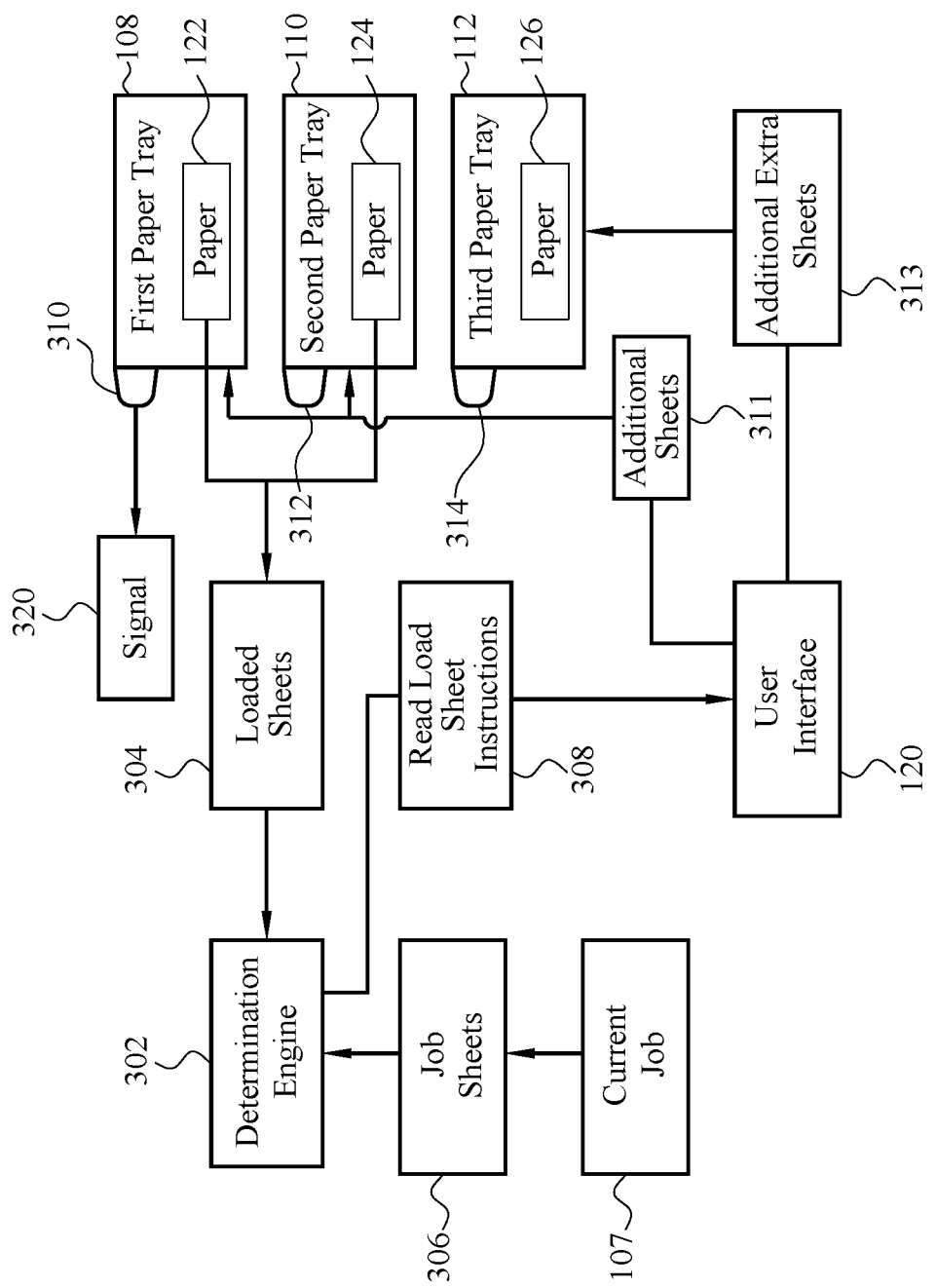
FIG. 3 illustrates a block diagram of management of the paper trays on the printing device in greater detail according to the disclosed embodiments.

FIG. 3 depicts a block diagram of management of the paper trays on printing device 104 in greater detail according to the disclosed embodiments. FIG. 3 shows first paper tray 108 having paper 122, second paper tray 110 having paper 124, and third paper tray 112 having paper 126. The paper trays may be opened, removed, or replaced on printing device 104. For example, first paper tray 108 may be opened or removed to add paper 122 for printing operations at printing device 104.

To indicate when paper trays are opened or removed, printing device 104 may includes sensors to determine whether the respective paper trays are closed or installed.

Thus, sensor 310 may determine whether first paper tray 108 is installed onto printing device 104. When first paper tray 108 is opened, sensor 310 may detect this action and generate a signal to inform DFE 106 that the paper tray is opened. With regard to second paper tray 110, sensor 312 determines when the second paper tray is opened, removed, or replaced. When one of these actions occurs, sensor 312 may generate a signal. For example, second paper tray 110 is opened to load paper 124. Sensor 312 sends a signal to DFE 106. Sensor 314 determines when third paper tray 112 is opened, removed, or replaced to load paper 126.

Current job 107 is being processed and printed at printing device 104. First paper tray 108 and second paper tray 110 may be part of paper tray group 138 that is providing sheets of paper to print current job 107. Third paper tray 112 may be assigned to another paper tray group. The disclosed embodiments determine a number of job sheets 306 needed to complete current job 107. The number of job sheets 306 may change as more pages are printed of current job 107. Before printing of current job 107 commences, the disclosed embodiments may determine the number of job sheets 306 needed to completely print the document for current job 107.

The disclosed embodiments also determine a number of loaded sheets 304 from the associated paper tray group on printing device 104. In this instance, paper tray group 138 includes first paper tray 108 and second paper tray 110. The paper trays provide the number of sheets of paper loaded thereon. Thus, first paper tray 108 provides a number of sheets of paper 122. Second paper tray 110 provides a number of sheets of paper 124. The total number of sheets of paper 122 and paper 124 are loaded sheets 304. This number reflects the total number of sheets of paper available to print current job 107.

Determination engine 302 compares job sheets 306 for current job 107 with loaded sheets 304 for first paper tray group 138, or first paper tray 108 and second paper tray 110. In some embodiments, determination engine 302 may be implemented within DFE 106. In other embodiments, determination engine 302 may be implemented within printing system 100. If loaded sheets 304 exceeds job sheets 306, then the disclosed embodiments may proceed with printing operations. Nothing else really needs to be done with first paper tray 108 and second paper tray 110.

If job sheets 306 exceeds loaded sheets 304, then the disclosed embodiments may take actions in order to make sure the number of loaded sheets 304 is acceptable to process current job 107. Determination engine 302, or DFE 106, may send a load sheets instruction 308 to user interface 120 to prompt the operator to load additional sheets 311 into one or more of the paper trays installed on printing device 104. The corresponding sensor to the paper tray may alert DFE 106 or determination engine 302 that the paper tray is opened and, presumably, the additional sheets loaded.

If a single tray, such as first paper tray 108, that holds the paper for current job 107, then the disclosed embodiments may prompt the operator to load additional sheets 311 into another paper tray. For example, load sheets instruction 308 may prompt the operator to load additional sheets 311 into second paper tray 110 to increase the number of sheets of paper 124. If printing device 104 is configured to use paper tray groups, then the disclosed embodiments may only prompt the operator to load additional sheets 311 in one of the paper trays within the paper tray group, without the need to identify a specific paper tray. As second paper tray 110 is within paper tray group 138 with first paper tray 108, a prompt may be generated to load additional sheets 311 to second paper tray 110.

In some embodiments, determination engine 302 may generate load sheets instruction 308 to add another paper tray to the paper tray group. For example, if paper tray group 138 does not contain enough loaded sheets 304 to complete current job 107, then the disclosed embodiments may prompt the operator to load extra additional sheets 313 into third paper tray 112. If this still is not enough loaded sheets 304, then fourth paper tray 114 may be loaded, and so on. Third paper tray 112 may be assigned to paper tray group 138 along with first paper tray 108 and second paper tray 110. The disclosed embodiments may modify the paper tray group as needed until loaded sheets 304 exceeds job sheets 306.

Printing device 104 may limit the number of trays that are dedicated to a print job based on the tray groups needed for other types of print jobs. For example, printing device 104 may include paper tray group 138, 140, and 142. The disclosed embodiments may not be able to leave each group without a paper tray. For example, if paper tray group 138 needs four paper trays to provide enough loaded sheets 304, then the disclosed embodiments may take a paper tray from paper tray group 140 and a paper tray from paper tray group 142 so that each paper tray group has at least one paper tray. As further printing operations occur, the paper trays may be reassigned back to their original paper tray groups. In other embodiments, DFE 106, printing device 104, or printing system 100 may limit the number of paper trays that may be assigned to a print job.

As disclosed above, the disclosed embodiments also detect whether the paper tray is opened to load additional sheets 311 or extra additional sheets 313. For example, sensor 310 detects when first paper tray 108 is opened and generates signal 320 to let DFE 106 or determination engine 302 know that the loading operations are being done. Current job 107 may not commence printing operations until sensor 310 indicates that first paper tray 108 is closed again. Sensors 312 and 314 for second paper tray 110 and third paper tray 112 also may send signals to indicate that the additional sheets required for printing current job 107 have been loaded. This feature ensures that current job 107 does not commence printing operations without enough loaded sheets 304 to complete the job, thereby avoiding shutdowns and delays if printing device 104 runs out of paper.

Figure 4:
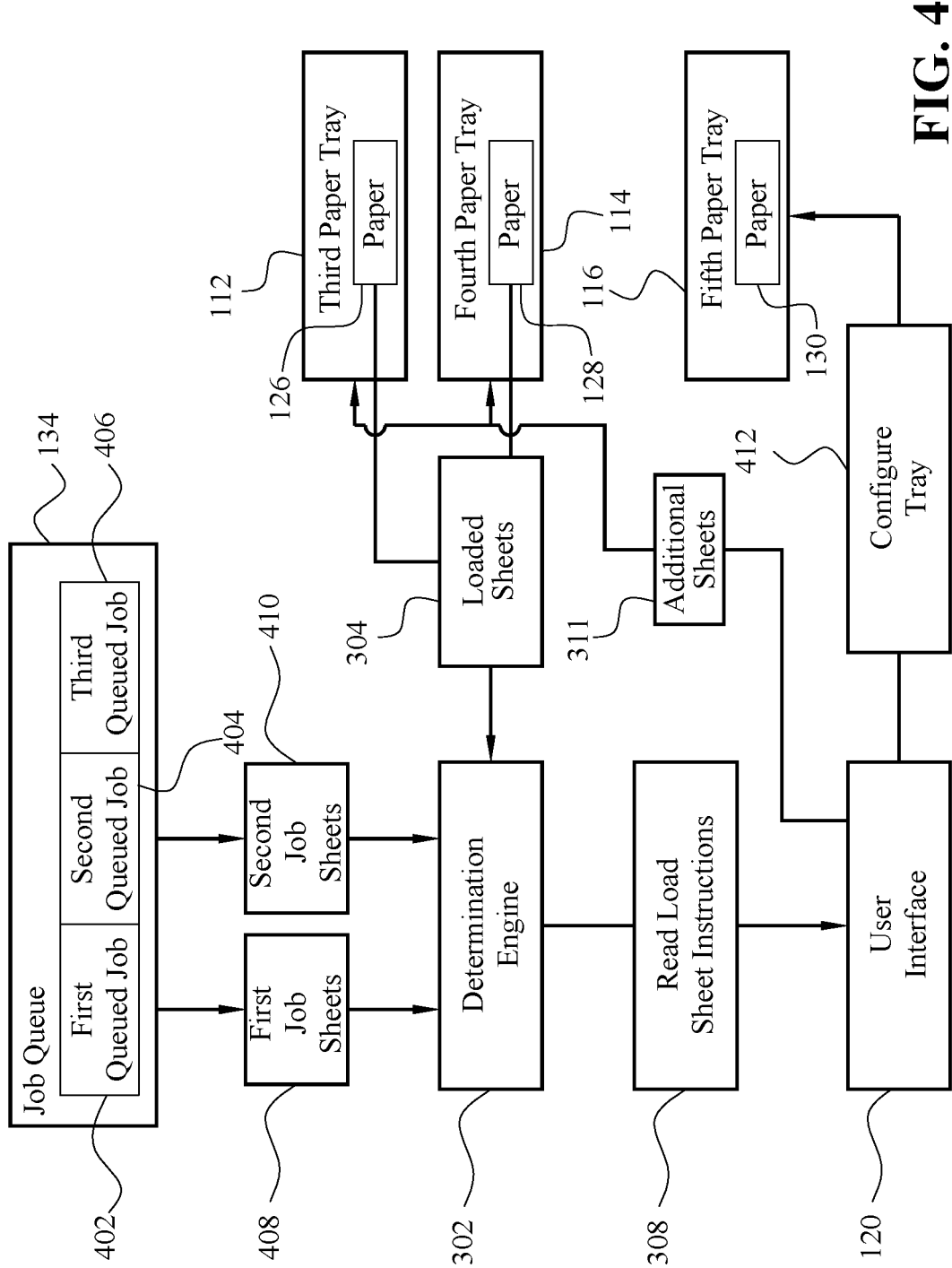
FIG. 4 illustrates another block diagram of management of the paper trays on the printing device in greater detail according to the disclosed embodiments.

FIG. 4 depicts another block diagram of management of the paper trays on printing device 104 in greater detail according to the disclosed embodiments. If loaded sheets 304 is sufficient to complete current job 107, or if the maximum number of paper trays that can be dedicated to current job 107 is reached, then the disclosed embodiments may evaluate the next job in job queue 134. Print jobs are received at DFE 106 and placed in job queue 134. For example, in addition to printing current job 107, printing device 104 may have additional print jobs to process and print. Job queue 134 may include first queued job 402, second queued job 404, and third queued job 406.

The next job in job queue 134 may be evaluated. If there are available paper trays on printing device 104, then the disclosed embodiments may prompt the operator to load sheets in those paper trays so printing device 104 is ready to print the next job once current job 107 is done. Thus, DFE 106 or determination engine 302 may determine that paper tray group 140 of third paper tray 112 and fourth paper tray 114 are available. The disclosed embodiments may determine first job sheets 408 to print first queued job 402. The disclosed embodiments also may determine loaded sheets 304 from the number of sheets of paper 126 in third paper tray 112 and the number of sheets of paper 128 in fourth paper tray 114. Determination engine 302 compares first job sheets 408 and loaded sheets 304 to determine if additional sheets need to be loaded into the paper trays.

If the number of first sheets 408 exceeds loaded sheets 304, then determination engine 302 generates load sheets instruction 308 and sends it to user interface 120 to prompt the operator to load additional sheets 311 into one or more paper trays of paper tray group 140. As disclosed above, additional paper trays may be added to the paper tray group in order to make enough loaded sheets 304 available to print first queued job 402. As long as there are available paper trays, the disclosed embodiments will continue to look ahead in job queue 134 to determine paper needs in order to prompt the operator to load additional sheets 311 as necessary.

If loaded sheets 304 is enough to print first queued job 402, then the disclosed embodiments may look to the next print job in job queue 134, or second queued job 404. Second queued job 404 may need to use second job sheets 410. The disclosed embodiments note that paper tray group 138 is dedicated to current job 107 and paper tray group 140 is dedicated to first queued job 402. That leaves paper trays of paper tray group 142 available to print second queued job 404. The disclosed embodiments may perform the same process as disclosed above to ensure loaded sheets 304 for fifth paper tray 116 and sixth paper tray 118 meet the requirements of second job sheets 410.

In some instances, the paper or media needed for second queued job 404 is not loaded on printing device 104. For example, fifth paper tray 116 may be configured to print letter sized paper while second job sheets 410 call for legal sized paper. Determination engine 302 determines that one or more paper trays need to be configured to load legal sized paper. Thus, load sheets instruction 308 may actually instruct the operator to configure fifth paper tray 116 to load the legal sized sheets as paper 130. A configure tray operation 412 may be prompted at user interface 120. Thus, the disclosed embodiments can make sure that the appropriate paper trays are available to load sheets needed for print jobs in job queue 134.

In some instances, there may not be any available trays to load additional sheets 304 or to perform configure tray operation 412. Current job 107 also may be using multiple paper trays. If so, then DFE 106 or determination engine 302 will wait until the currently loaded sheets is sufficient to complete current job 107 and there is at least one tray available before looking ahead to print jobs in job queue 134. When these criteria are met, the disclosed embodiments may prompt the operator to configure the newly available tray, such as fifth paper tray 116, so that it can be used for the subsequent print job.

In other instances, different paper trays have different capabilities, such as a different range of supported sizes and paper weights. The disclosed embodiments may subset the paper trays under consideration to only those that can reproduce the print job being considered. For example, fifth paper tray 116 may be the only tray able to reproduce second queued job 404 so determination engine 302 will only consider loaded sheets 304 from that paper tray. Additionally, the disclosed embodiments may consider not just the paper trays that can reproduce current job 107 but also the paper trays that are required for additional print jobs. Thus, if paper tray group 140 needs to add a paper tray to third paper tray 112 and fourth paper tray 114 to meet the needs for first job sheets 408, then the disclosed embodiments will not consider fifth paper tray 116 as it is needed for second queued job 404. The disclosed embodiments will give preference to keeping the paper trays with the broadest media support open for as long as possible to ensure tray reconfiguration can be done as far ahead as possible.

As disclosed above, sensors on the paper trays confirm that they have been opened and closed. DFE 106 may use this information to determine that the papers have been loaded to provide enough loaded sheets 304 to print the print jobs in job queue 134. If a paper tray is reconfigured to accommodate a subsequent print job, then the sensor for that tray generates a signal to indicate it was opened and the paper loaded.

Figure 5:
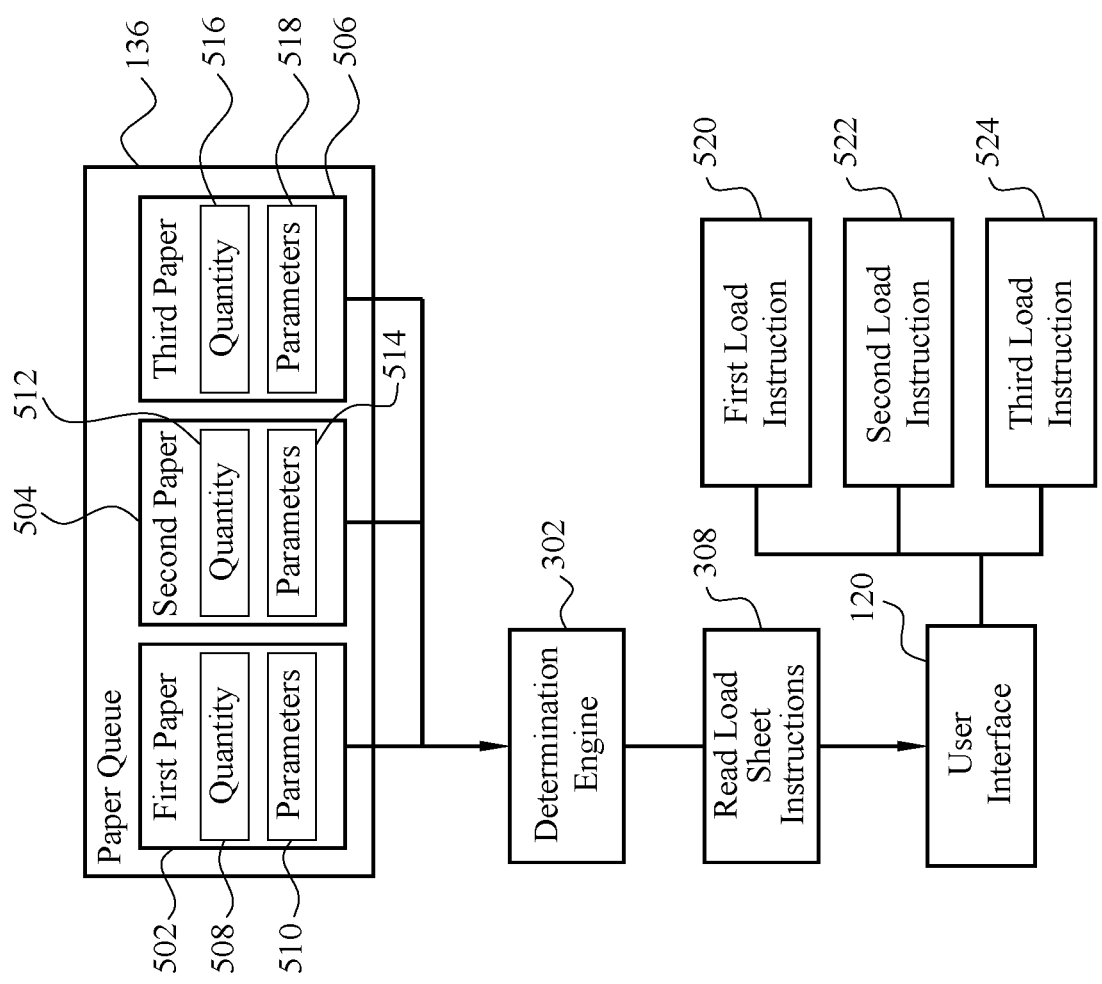
FIG. 5 illustrates another block diagram of management of the paper trays on the printing device in greater detail according to the disclosed embodiments.

FIG. 5 depicts another block diagram of management of the paper trays on printing device 104 in greater detail according to the disclosed embodiments. In DFE 106, paper queue 136 may be used. Paper queue 136 includes a list of papers that must be loaded, the order in which they must be loaded, and the quantity that is required for each paper. This list of papers is not the currently loaded sheets 304, even if they are needed for the current or queued jobs. These are the papers that the operator must load into printing device 104.

For example, paper queue 136 may include first paper 502, second paper 504, and third paper 506. Each paper may have a quantity of the number of sheets needed and parameters for the paper, such as size, weight, finish, and the like. In some embodiments, for example, first paper 502 may have parameters 510 and a quantity 508. First paper 502 may be related to multiple print jobs in that it is the total amount of paper needed to accomplish printing for current and subsequent jobs at printing device 104. Thus, quantity 508 may be the total number of sheets needed of first paper 502. Second paper 504 includes quantity 512 and parameters 514. Third paper 506 includes quantity 516 and parameters 518.

Determination engine 302, or DFE 106, may retrieve the entries from paper queue 136 in order so that the operator loads the papers in the order needed to processing the print jobs. Determination engine 302 determines the quantity needed for the papers and sends load sheets instruction 308 to user interface 120 to prompt the operator to load the papers onto the printing device. Determination engine 302 may prompt first load instruction 520 for first paper 502 within paper queue 136. First load instruction 520 may instruct the operator to load quantity 508 of first paper 502 into one or more paper trays, or a paper tray group. The disclosed embodiments may utilize the processes disclosed above to ensure enough paper trays are available to fulfill quantity 508.

Once first paper 502 is loaded, as confirmed by the paper trays being opened, the disclosed embodiments may remove first paper 502 from paper queue 136. Determination engine 302 then reviews second paper 504 to determine quantity 512 needed to be loaded onto printing device 104. Second load instruction 522 will prompt the operator to load second paper 504. Once complete, second paper 504 is removed from paper queue 136. Then, third paper 506 is considered. Determination engine 302 determines quantity 516 of third paper 506 and issues third load instruction 524 to prompt the operator accordingly.

If, after loading first paper 502 into the paper trays, printing device 104 still does not have enough sheets to complete the current or subsequent print job, then the disclosed embodiments may decrement quantity 508 of first paper 502 so the operator knows how much more first paper 502 needs to be loaded in order to complete the job.

In user interface 120, the disclosed embodiments may allow the operator to display the paper that must be loaded next, or information for the first entry in paper queue 136. This feature allows the operator to see which paper to load next without needing to consult DFE 106. Further, the operator may load first paper 502 for use with multiple print jobs at one time as opposed to each time the print jobs are analyzed by determination engine 302.

When the operator opens a paper tray, the disclosed embodiments may display a warning letting the operator know that he/she should not unload this paper from printing device 104 if the paper already in the paper tray being opened is required for current job 107 or a job in job queue 134. Further, the disclosed embodiments may reconfigure the paper tray to match parameters for the paper, such as parameters 510 of first paper 502, to eliminate the need for the operator to reconfigure the paper tray if the paper already in the paper tray is not required for the current or a queued print job. The configuration may be done based on the job print ticketing attributes, as shown by the parameters.

Figure 6:
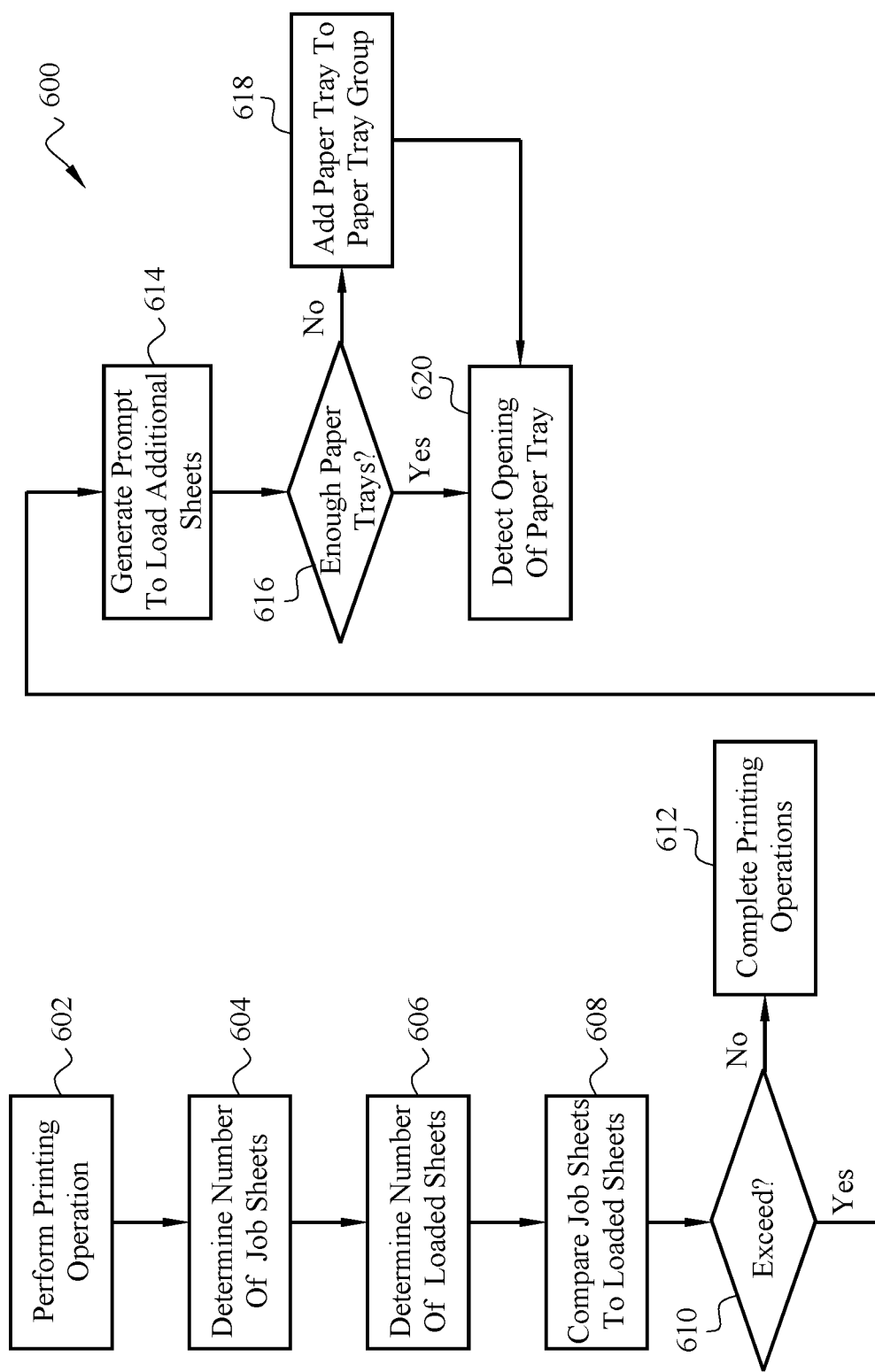
FIG. 6 illustrates a flowchart for managing printing operations using paper trays according to the disclosed embodiments.

FIG. 6 depicts a flowchart 600 for managing printing operations using paper trays according to the disclosed embodiments. Flowchart 600 may refer to FIGS. 1A-5 for illustrative purposes. Flowchart 600, however, is not limited to the embodiments disclosed by FIGS. 1A-5.

Step 602 executes by performing printing operations for current job 107 at printing device 104. DFE 106 may process current job 107 using the features disclosed in FIG. 1B to provide data for print engine 260. Before printing commences, DFE 106 may use determination engine 302 to determine whether additional sheets need to be loaded onto printing device 104. Step 604 executes by determining a number of job sheets 306 needed to complete printing current job 107.

Step 606 executes by determining a number of loaded sheets 304 within a paper tray group associated with current job 107. For example, current job 107 may be using paper from paper tray group 138, which includes first paper tray 108 and second paper tray 110. The number of sheets of paper 122 of first paper tray 108 and the number of sheets of paper 124 of second paper tray 110 are determined. These numbers are combined to determine the number of loaded sheets 304. If additional paper trays are within paper tray group 138, then the sheets of paper in those trays are added to loaded sheets 304.

Step 608 executes by comparing the number of job sheets 306 to the number of loaded sheets 304. DFE 106 or determination engine 302 may perform this step. Step 610 executes by determining whether the number of job sheets 306 exceeds the number of loaded sheets 304. In other words, determination engine 302 determines if there are enough loaded sheets 304 to complete current job 107. If step 610 is no, then step 612 executes by completing printing operations for current job 107. No additional sheets need to be loaded into paper tray group 138.

If step 610 is yes, then step 614 executes by generating a prompt to load additional sheets 311 into one or more paper trays of paper tray group 138. Determination engine 302 may send load sheets instruction 308 to user interface 120 to prompt the operator to load additional sheets 311 into first paper tray 108 or second paper tray 110, or both. As disclosed above, current job 107 may start using paper 122 from first paper tray 108 to generate the printed document so that the prompt is for the operator to load additional sheets 311 into second paper tray 110.

Step 616 executes by determining whether there are enough paper trays in paper tray group 138 to complete current job 107. In some instances, fully loaded first paper tray 108 and second paper tray 110 still may not provide enough loaded sheets 304 to meet the number of job sheets 306. If step 616 is no, then step 618 executes by adding a paper tray to paper tray group 138 to increase the amount of paper available for printing operations for current job 107. For example, third paper tray 112 may be added to paper tray group 138 and configured to load paper 126 needed for current job 107. The operator may be prompted to load extra additional sheets 313 in third paper tray 112.

If step 616 is yes, or after adding a paper tray to the paper tray group, then step 620 executes by detecting the paper tray prompted by the instructions is opened to load additional sheets 311 or extra additional sheets 313. A sensor connected to the paper tray being loaded detects that it is opened. A signal may be sent to DFE 106 that the sheets are being loaded. This action indicates that loaded sheets 304 for paper tray group 138, for example, is enough to meet the requirements of current job 107.

Figure 7:
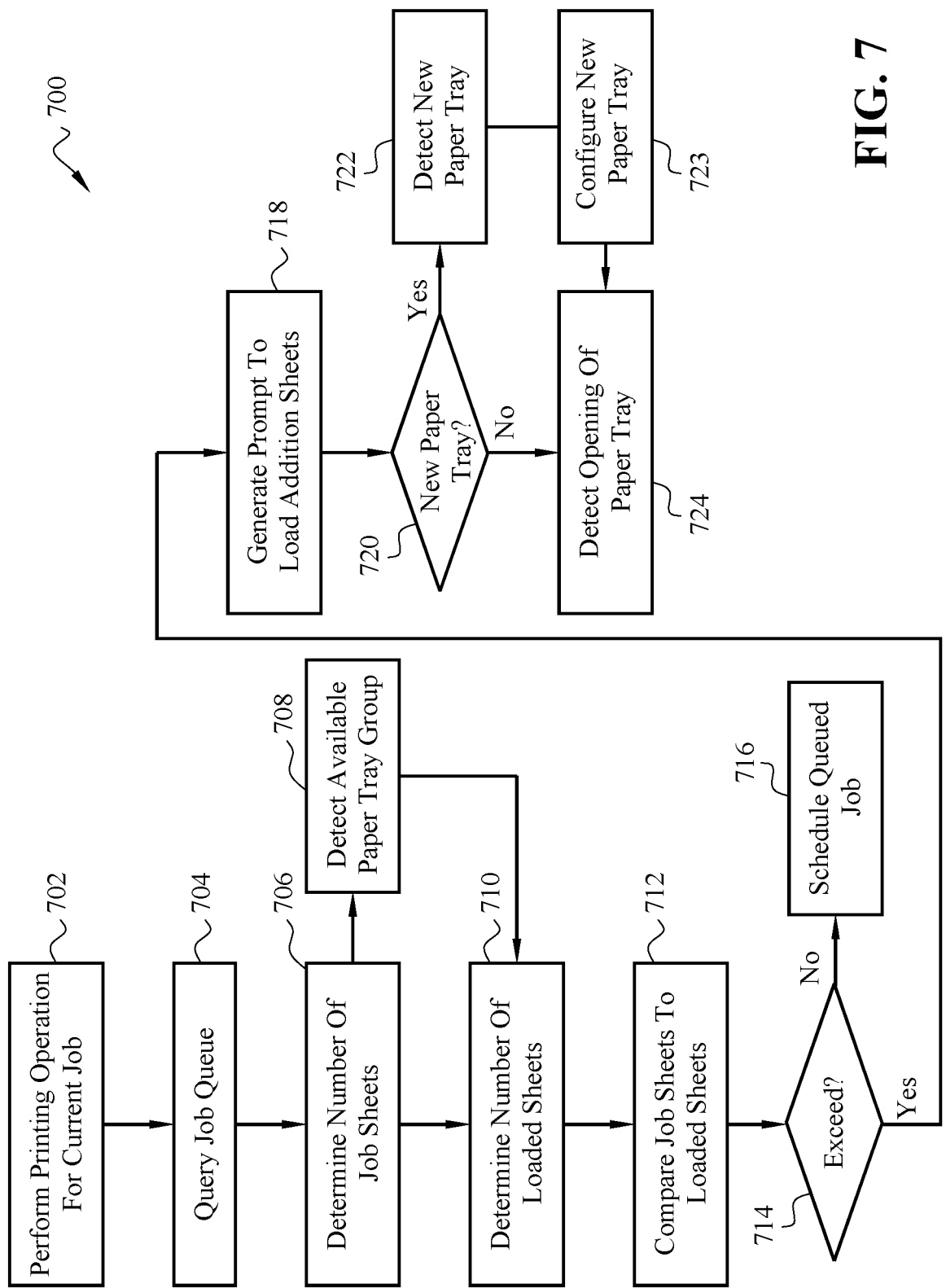
FIG. 7 illustrates a flowchart for managing printing operations using a job queue according to the disclosed embodiments.

FIG. 7 illustrates a flowchart 700 for managing printing operations using job queue 134 according to the disclosed embodiments. Flowchart 700 may refer to FIGS. 1A-6 for illustrative purposes. Flowchart 700, however, is not limited by the embodiments disclosed by FIGS. 1A-6.

Step 702 executes by performing printing operations at printing device 104 for current job 107. While current job 107 is being printed, the disclosed embodiments may look ahead to determine paper requirements for subsequent print jobs, such as print job 103. Step 704 executes by querying job queue 134 for a subsequent print job in the job queue, such as first queued job 402. Step 706 executes by determining a number of job sheets for the subsequent print job. For example, the disclosed embodiments may determine a number of first job sheets 408 for first queued job 402. In other words, the disclosed embodiments may determine the number of sheets needed to print out first queued job 402.

Step 708 executes by detecting an available paper tray group that can provide the paper for first queued print job 402. For example, the paper parameters for the media used by first queued print job 402 may require use of a specific paper tray group at printing device 104. For example, paper tray group 140, including third paper tray 112 and fourth paper tray 114, may be detected as available for printing operations for first queued print job 402. Step 710 executes by determining a number of loaded sheets 304 for paper tray group 140. This step is similar to step 606 disclosed above, except that loaded sheets 304 may refer to the number of sheets for paper 126 of third paper tray 112 and the number of sheets for paper 128 of fourth paper tray 114.

Step 712 executes by comparing the number of job sheets for the subsequent print job to the number of loaded sheets within the selected paper tray group. Using the above example, the number of first job sheets 408 is compared to the number of loaded sheets 304 for paper tray group 140 using determination engine 302. Step 714 executes by determining whether the number of first job sheets 408 exceeds the number of loaded sheets 304. Determination engine 302 may determine whether queued print job 402 requires more sheets of the paper than is available in the corresponding paper tray group. If no, then step 716 executes by scheduling the print job to proceed with processing and printing. First queued job 402 will be processed by DFE 106 and printed at printing device 104 using paper 126 and paper 128 from third paper tray 112 and fourth paper tray 114, respectively.

If step 714 is yes, then step 718 executes by generating a prompt to load additional sheets into paper tray group 140. Determination engine 302 may send load sheets instruction 308 to user interface 120, which prompts the operator to load additional sheets into third paper tray 112 and fourth paper tray 114 to place the number of loaded sheets 304 to equal or more than the number of first job sheets 408.

Step 720 executes by determining whether a new paper tray is needed to print the subsequent print job. For example, first queued job 402 may require a number of first job sheets 408 greater than what paper tray group 140 can provided. In this instance, another paper tray should be added to paper tray group 140. If step 720 is no, then flowchart 700 proceeds to step 724, disclosed in greater detail below.

If step 720 is yes, then step 722 executes by detecting a new paper tray installed on printing device 104 that can be used for printing operations of the subsequent print job. For example, the disclosed embodiments detect that fifth paper tray 116 can print the paper needed for first queued job 402. Fifth paper tray 116 may be able to print the size of paper needed for first queued job 402. It should be noted that paper tray group 142, which previously included fifth paper tray 116, should be left with at least one paper tray.

Step 723 executes by configuring the new paper tray to be within the paper tray group. For example, the disclosed embodiments may perform a configure tray operation 412 to configure fifth paper tray 116 to be within paper tray group 140. Paper 130 may be loaded onto fifth paper tray 116 that is similar to the paper media used for paper 126 and paper 128. Step 724 executes by detecting the opening of the one or more paper trays having additional sheets added to meet the requirements of the subsequent print job. This step is similar to step 620 disclosed above. Sensors on the trays detect that they have been opened. The signal is sent to DFE 106 or determination engine 302 to indicate that the loading operations are complete.

Figure 8:
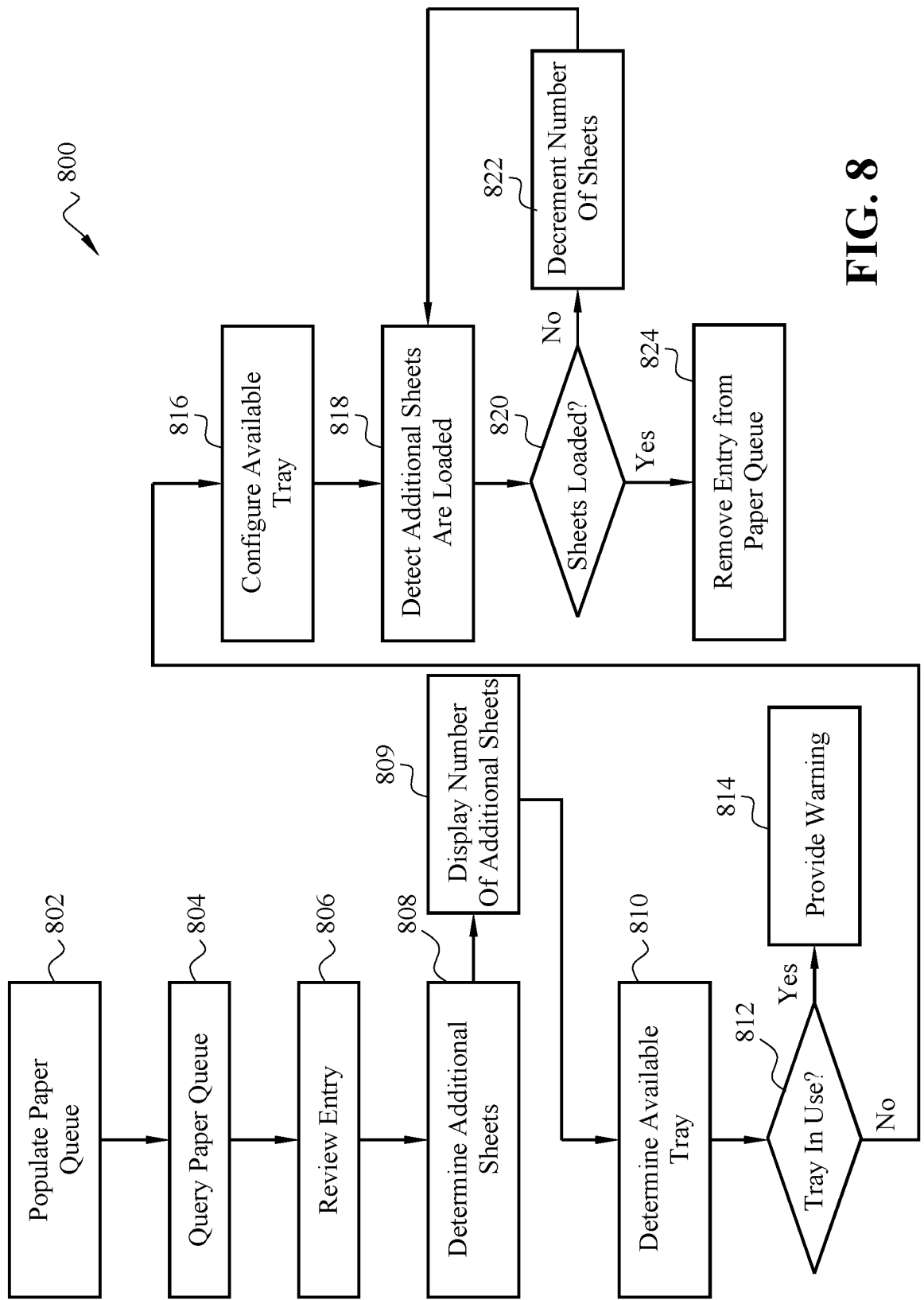
FIG. 8 illustrates a flowchart for managing printing operations using a paper queue according to the disclosed embodiments.

FIG. 8 depicts a flowchart 800 for managing printing operations using paper queue 136 according to the disclosed embodiments. Flowchart 800 may refer to FIGS. 1A-7 for illustrative purposes. Flowchart 800, however, is not limited to the embodiments disclosed by FIGS. 1A-7.

Step 802 executes by populating paper queue 136 with entries for print jobs within job queue 134. The entries in paper queue 136 reflect the paper that must be loaded to fulfill the requirements of the pending print jobs. Entries should not reflect paper that is already loaded onto printing device 104. Entries may be for different types of paper and media that is to be loaded. For example, referring to FIG. 5, first paper 502 includes parameters 510 that correspond to features of the paper, such as size, weight, paper type, finish, and the like. First paper 502 may be used for multiple print jobs within job queue 134. Second paper 504 may be a different paper having different parameters 514 than parameters 510 of first paper 502.

Step 804 executes by querying paper queue 136 for an entry, such one for first paper 502. Step 806 executes by reviewing the entry to determine a number of sheets of first paper 502 for the print jobs in job queue 134. Quantity 508 of first paper 502 may indicate the number of sheets needed to be loaded. Step 808 executes by determining additional sheets need to be loaded into a printing tray group at printing device 104. The disclosed embodiments may select a printing tray group to load quantity 508 of first paper 502. It should be noted that quantity 508 is not compared to job sheets for current job 107 or a print job within job queue 134.

Step 809 executes by displaying the number of additional sheets, or quantity 508, of first paper 502 to be loaded onto the paper tray group. For example, determination engine 302 may determine that paper tray group 142 of fifth paper tray 116 and sixth paper tray 118 is to be loaded with first paper 502 according to the entry within paper queue 136. User interface 120 may display quantity 508 of first paper 502 to be loaded onto paper tray group 142.

Step 810 executes by determining an available tray from the paper tray group. Using the above example, determination engine 302 or DFE 106 may determine that fifth paper tray 116 as being available. Step 812 executes by determining whether the available paper tray is in use with a current or pending print job. In other words, fifth paper tray 116 includes paper 130 for use by current job 107. If so, then the disclosed embodiments do not want to remove paper 130 to load first paper 502. If step 812 is yes, then step 814 executes by providing a warning to the operator that fifth paper tray 116 includes sheets for current job 107, or that removing paper 130 may cause problems.

If step 812 is no, then step 816 executes by configuring the available tray to include first paper 502. Parameters 510 may be used to configure the available tray. For example, fifth paper tray 116 may be configured to indicate it includes first paper 502 as paper 130. The operator may be prompted to load first paper 502 into paper tray group 142, including fifth paper tray 116. Step 818 executes by detecting the number of sheets of first paper 502 is loaded into one or more paper trays. Using the above disclosed embodiments, a sensor for fifth paper tray 116 may detect that it is opened and a signal sent to DFE 106 that the papers are loaded.

Step 820 executes by determining whether enough sheets of first paper 502 are loaded to meet the requirements of the entry in paper queue 136. In other words, the determination relates to the number of sheets loaded meets quantity 508 for first paper 502. If no, then step 822 executes by decrementing the number of sheets loaded from quantity 508 for first paper 502. The entry for first paper 502 remains in paper queue 136. DFE 106 or determination engine 302 decrements the number of loaded sheets to reduce quantity 508. Flowchart 800 may proceed back to step 818 to detect when more sheets are loaded into paper tray group 142.

If step 820 is yes, then the entry for first paper 502 is removed from paper queue 136. The amount of paper needed to meet the requirements for the print jobs using first paper 502 is met. The disclosed embodiments may move to the next entry in paper queue 136, or second paper 504, to be loaded onto printing device 104 when paper trays become available.

In some embodiments, the above disclosed processes may be performed in DFE 106. In some embodiments, DFE 106 may not be embedded within printing device 104 and may be a separate component that processes print jobs for several printing devices. In this instance, DFE 106 may utilize paper tray groups between multiple printing devices. Further, determination engine 302 may be used by DFE 106 to perform the operations disclosed above. In other embodiments, DFE 106 may use its own logic to perform the operations. In other embodiments, the processes disclosed above may be performed at another component separate from DFE 106 and printing device 104, but manages printing operations at printing device 104.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for performing printing operations, the method comprising:
   performing printing operations for a print job at a printing device, wherein the printing device includes a plurality of paper trays;
   querying a paper queue for the printing device, wherein the paper queue includes an entry for a print media corresponding to the print job;
   assigning a printing tray group among the plurality of paper trays to be used to complete the print job;
   reviewing the entry to determining a number of job sheets of the print media needed to complete the print job;
   determining a number of loaded sheets of the print media within the printing tray group;
   determining the number of job sheets exceeds the number of loaded sheets;
   prompting an operator to load additional sheets of the print media into a first printing tray of the printing tray group;
   detecting the first printing tray is opened to load the additional sheets;
   if the sheets of the first printing tray, after loaded, is insufficient to complete the print job, prompting an operator to load additional sheets of the print media in to a second printing tray of the printing tray group, and
   assigning a printing tray from another printing tray group within the plurality of paper trays to the printing group if an additional printing tray is needed to complete the print job.

2. The method of claim 1, further comprising continuing the printing operations when the first printing tray is detected as open.

3. The method of claim 1, wherein the printing tray group includes the first printing tray and the second printing tray.

4. The method of claim 3, wherein determining the number of loaded sheets includes determining the number of loaded sheets within the second printing tray.

5. The method of claim 3, wherein the printing tray group also includes a third printing tray.

6. The method of claim 5, wherein determining the number of loaded sheets includes determining the number of loaded sheets within the second printing tray and the third printing tray.

7. The method of claim 1, further comprising assigning a second printing tray group to complete a next print job.

8. The method of claim 1, further comprising reconfiguring the printing tray groups based on a quantity and the parameter of the print job, wherein the parameter includes at least a size of the paper, a weight of the paper, and a finish for the print job.

9. The method of claim 1, further comprising populating the paper queue with entries for print jobs within a job queue.

10. The method of claim 1, wherein the paper trays assigned in the printing tray group is modifiable to include at least one additional paper trays or to remove at least one additional paper tray to and from the printing tray group based on the number of job sheets needed to complete the print job and the entry contained in the paper queue.

11. The method of claim 1, wherein the paper queue is saved in a digital front end (DFE) of the printing device.

* * * * *